May 12, 1959
H. DRESSLER ET AL
2,885,981
BUTTONHOLING DEVICE
Filed Dec. 29, 1954
4 Sheets-Sheet 1
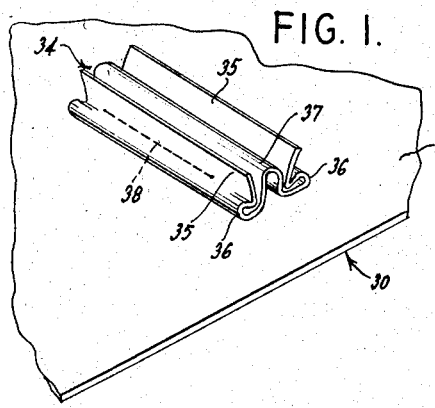
FIG. 1.
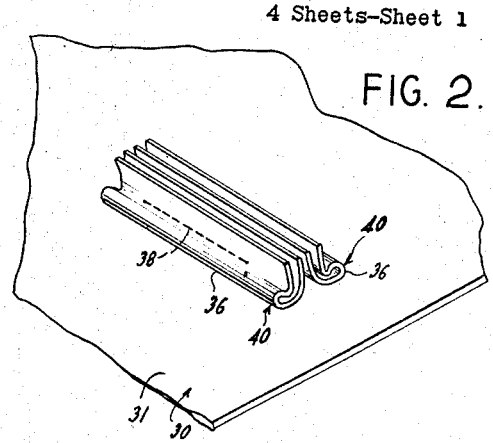
FIG. 2.
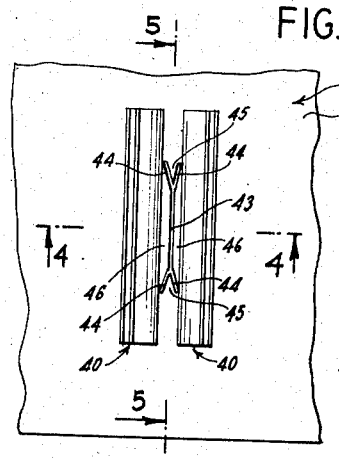
FIG. 3.
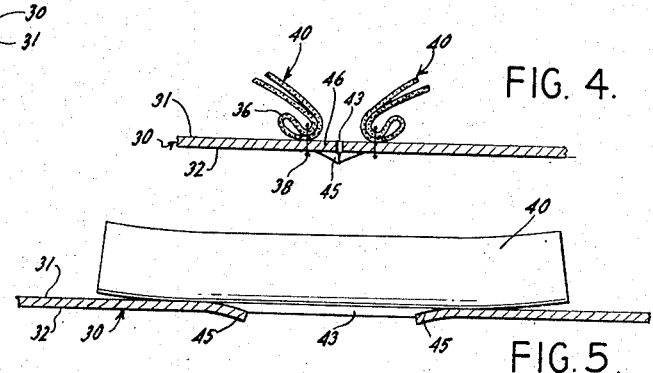
FIG. 4.
FIG. 5.
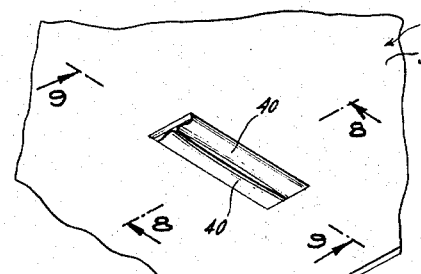
FIG. 6.
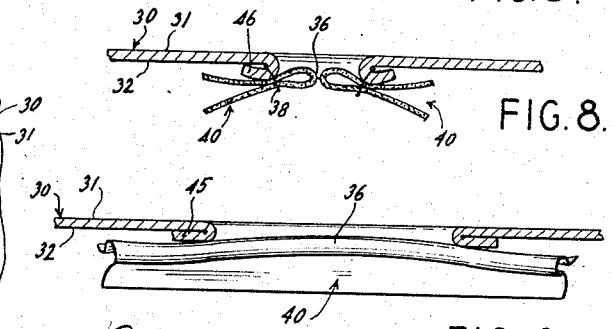
FIG. 8.
FIG. 9.
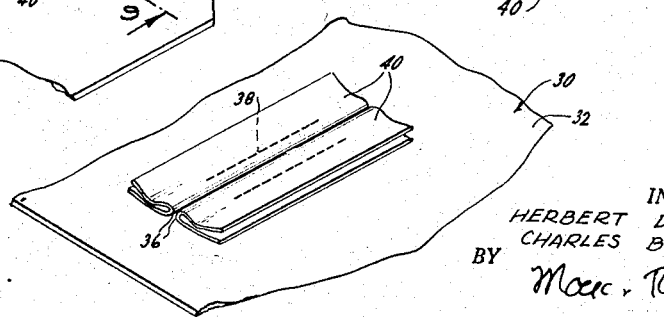
FIG. 7.
INVENTORS
HERBERT DRESSLER
CHARLES BIONDO
BY
ATTORNEYS

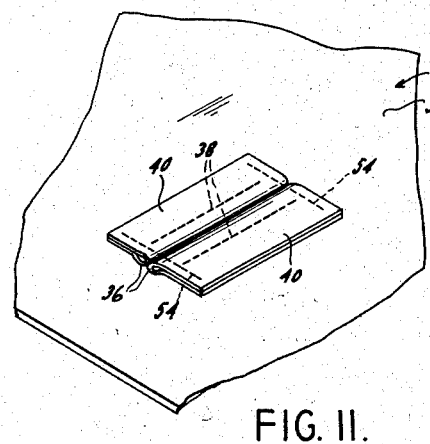
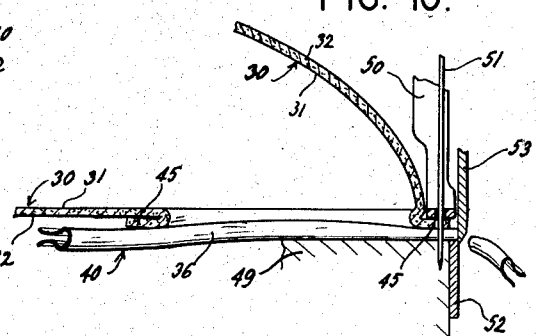
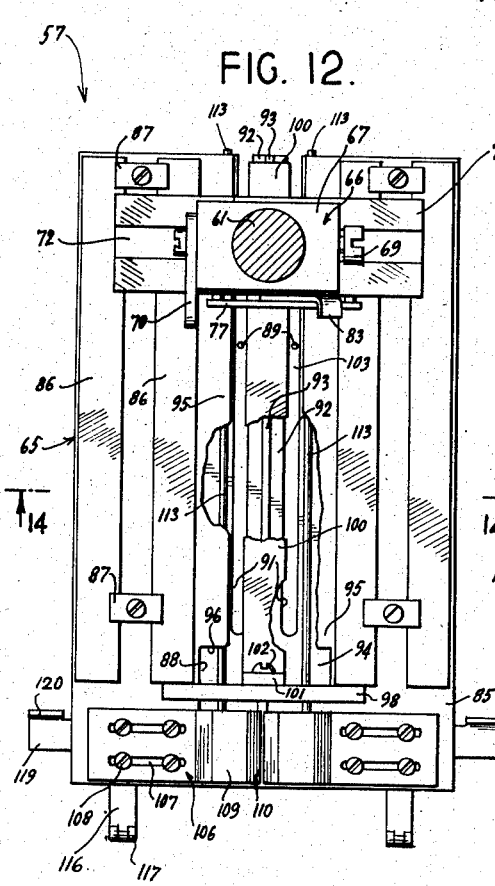

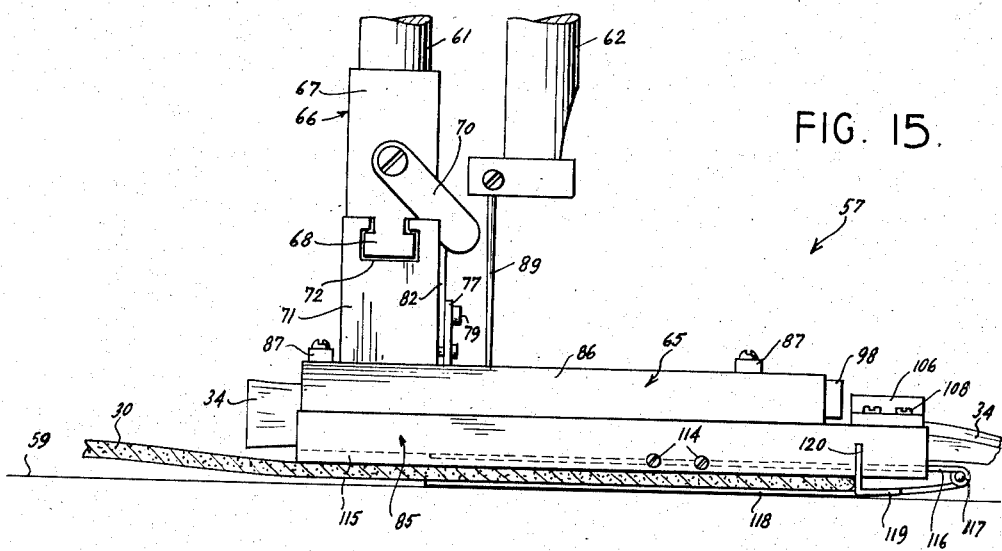
FIG. 15.
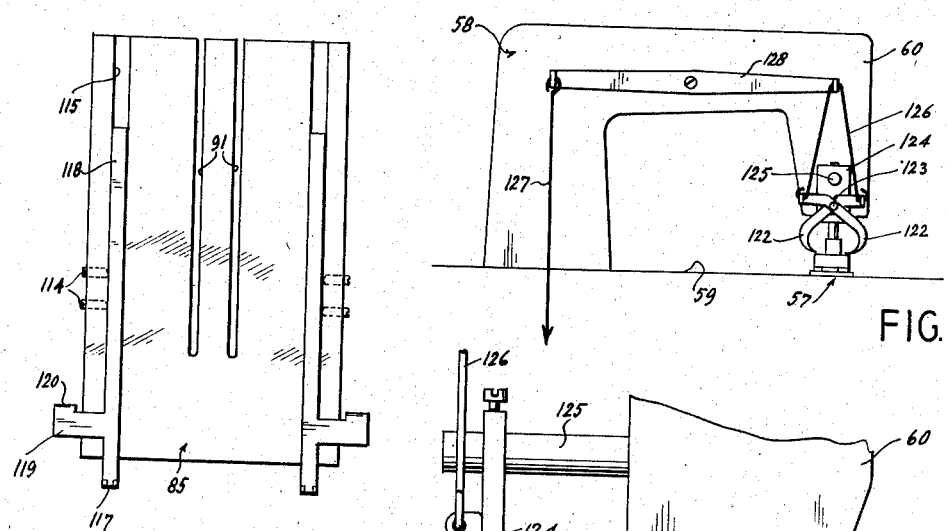
FIG. 16.
FIG. 17.
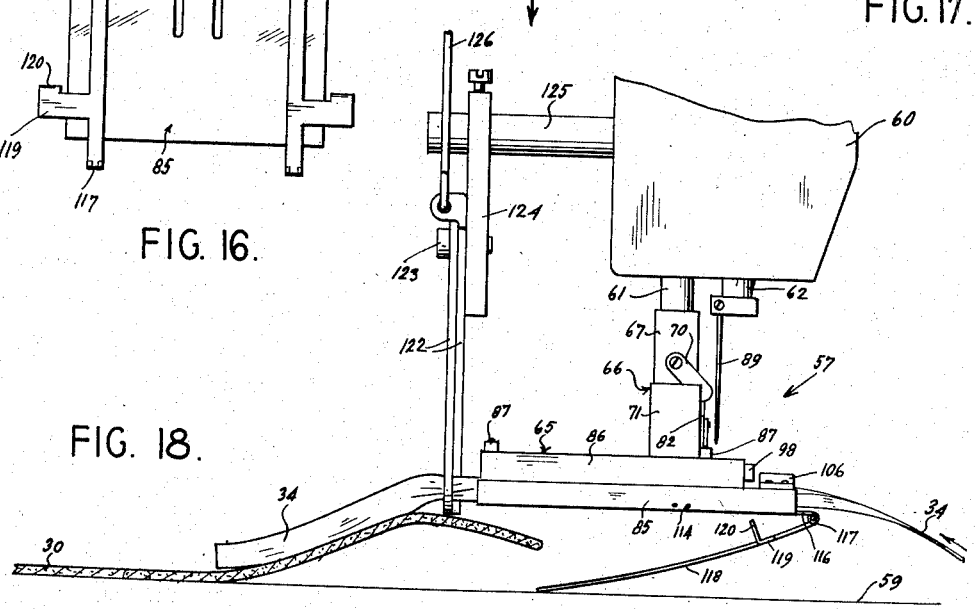
FIG. 18.

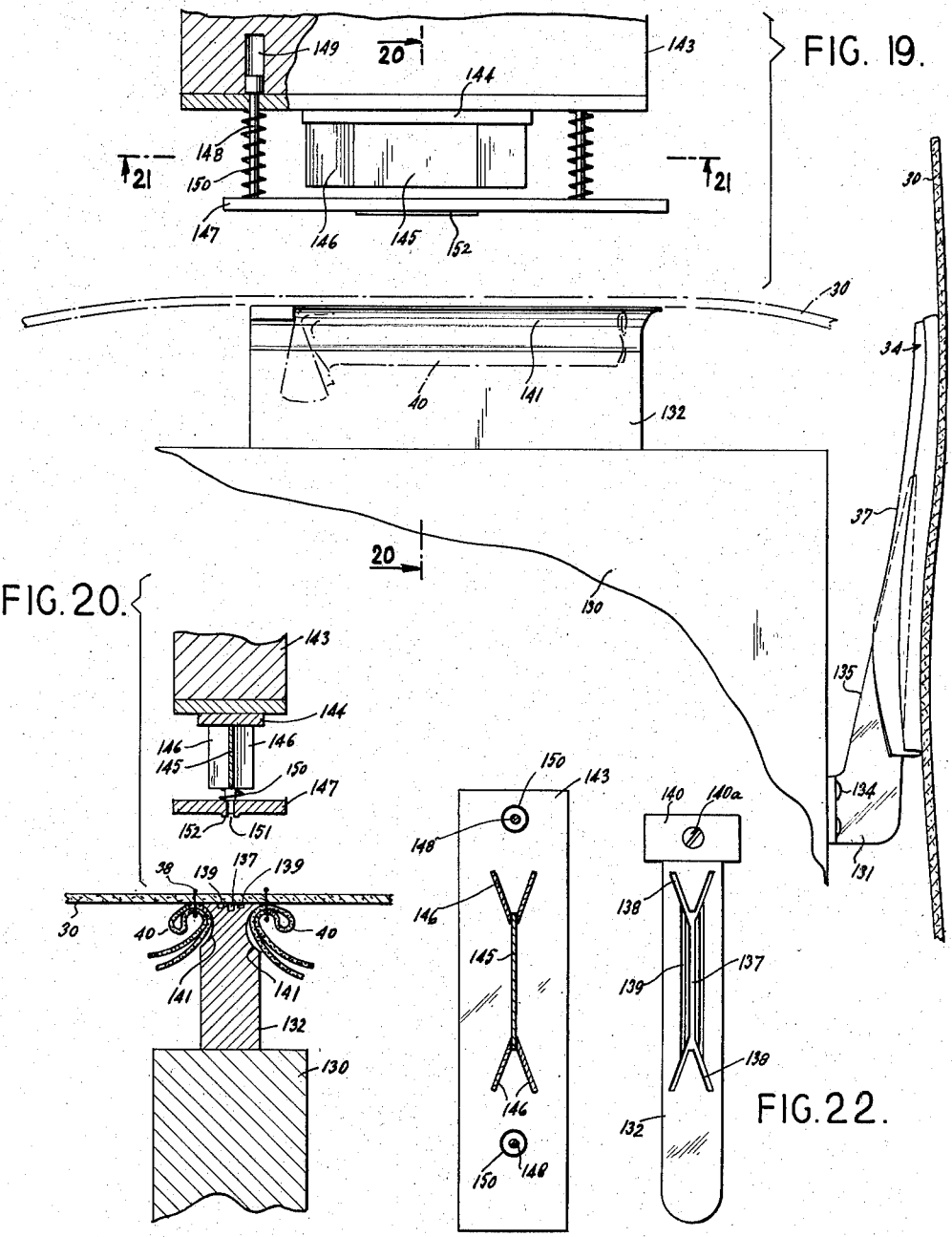

United States Patent Office 2,885,981
Patented May 12, 1959

2,885,981
BUTTONHOLING DEVICE

Herbert Dressler, Bronxville, and Charles Biondo, Brooklyn, N.Y.

Application December 29, 1954, Serial No. 478,274

5 Claims. (Cl. 112—77)

This invention relates generally to methods of edging flexible sheet material, and embraces apparatus for use in such methods.

The particular embodiment of the instant method, which is illustrated in the drawings and which will be described hereinafter in greater detail, comprises generally, providing a strip having one longitudinal edge beaded or otherwise finished, arranging the strip on one side of a sheet along one edge of the latter with its finished edge facing away from the sheet edge, securing the strip and sheet together along a line spaced from the finished strip edge, and swinging the strip about the line of securement to position the finished strip edge along a fold of the sheet.

It is a general object of the present invention to provide a simple, efficient and economical method of applying edging to a flexible base sheet, which method is particularly well adapted for use in making buttonholes and pockets, as well as the general application of edging, where desired.

It is another object of the present invention to provide a highly improved edging method of the type described, which method may be quickly and easily performed with only ordinarily skill to produce a neat, attractive and long wearing border or edging. More particularly, the instant edging method permits of using a wide variety of edging materials to achieve the necessary durability, and an indefinitely wide variety of ornamental effects. Further, the edging method of the present invention is adapted to present a finished, beaded edge by employing either beaded or plain edging material, as desired, and without the use of buttonhole stitching or other tedious operations.

It is another object of the present invention to provide a method of edging having the advantageous characteristics mentioned in the foregoing paragraphs, wherein a pair of edgings are adapted to be applied simultaneously so as to effect substantial reduction in both the number of operations and time consumed in various procedures, such as buttonholing and pocket edging.

It is a further object of the present invention to provide apparatus for use in practicing the edging method of the present invention, which is simple in construction and operation, durable in use, and which serves to greatly facilitate the application of edging according to the present invention. One advantageous feature of such apparatus is the provision of an attachment for a conventional sewing machine which adapts the latter for rapid and reliable application of the edging material; while another feature resides in the provision of novel means for accurately severing either or both the edging and base sheet, as required, with a minimum of effort and skill.

Other objects of the present invention will become apparent upon reading the following specification and referring to the accompanying drawings, which form a material part of this disclosure.

The invention accordingly consists in the features of construction, and combinations and arrangements of elements and method steps, which will be exemplified in the following description, and of which the scope will be indicated by the appended claims.

In the drawings:

Figure 1 is a perspective view illustrating an initial stage in forming a buttonhole according to the method of the present invention;

Fig. 2 is a perspective view similar to Fig. 1 and showing an early stage in the buttonhole forming method;

Fig. 3 is a top plan view illustrating a later stage in the buttonhole forming procedure;

Fig. 4 is a sectional view taken substantially along the line 4—4 of Fig. 3;

Fig. 5 is a sectional view taken substantially along the line 5—5 of Fig. 3;

Fig. 6 is a top perspective view showing a still later stage of the buttonhole forming procedure;

Fig. 7 is a bottom perspective view illustrating the method of the present invention at the stage of Fig. 6;

Fig. 8 is a transverse sectional view taken substantially along the line 8—8 of Fig. 6;

Fig. 9 is a longitudinal sectional view taken substantially along the line 9—9 of Fig. 6;

Fig. 10 is a sectional view illustrating a finishing step of the buttonhole forming procedure;

Fig. 11 is a bottom perspective view showing a finished buttonhole formed in accordance with the method of the present invention;

Fig. 12 is a horizontal sectional view showing a sewing machine attachment for use in practice of the present invention and partly broken away for clarity of understanding;

Fig. 13 is a front view showing the device of Fig. 12;

Fig. 14 is a sectional view taken substantially along the line 14—14 of Fig. 12;

Fig. 15 is a side elevational view showing the device of Fig. 12 in an early stage of the buttonholing procedure;

Fig. 16 is a bottom plan view of the sewing machine attachment;

Fig. 17 is a rear elevational view showing the device of Fig. 12 attached to a sewing machine, and illustrating a cutter adapted for use with the sewing machine attachment;

Fig. 18 is a side elevational view illustrating the sewing machine attachment and cutter at a later stage of the buttonhole forming procedure;

Fig. 19 is an elevational view showing another device including die cutting means, adapted for use in practicing the method of the instant invention;

Fig. 20 is a vertical sectional view taken substantially along the line 20—20 of Fig. 19;

Fig. 21 is a horizontal sectional view taken substantially along the line 21—21 of Fig. 19; and Fig. 22 is a plan view showing an anvil element of the device of Fig. 19.

While the method and apparatus of the present invention have been primarily developed and employed in connection with the forming of buttonholes in garments, and are illustrated and described hereinafter with particular reference thereto, it is understood that the invention is equally applicable to the formation of edgings on pocket holes and elsewhere, as desired. Hence, the term buttonhole as used hereinafter is intended to comprehend pocket holes, and other slits, openings and edges generally provided with an edging.

Referring now more particularly to the drawings, and specifically to Fig. 1 thereof, 30 designates a base sheet of flexible material, such as woven fabric or the like in which a buttonhole is to be formed. The base sheet 30 includes a normally exposed, right side or face 31, and a normally concealed wrong side or face 32, the latter being concealed in Fig. 1.

An edging sheet, strip, or ribbon generally designated 34, is arranged on the right side of the base sheet 30, and may be fabricated of any suitable flexible material selected for its ornamental and wearing qualities. The longitudinal margins or side portions 35, 35 of the edging strip 34 are folded or turned upwards and inwards along a pair of longitudinally extending, parallel spaced folds 36, 36. In addition, the longitudinal central portion 37 of the edging strip or ribbon 34 is transversely bent so as to form an upstanding longitudinal corrugation or ridge between the side portions 35, 35. With the edging sheet 34 in this condition on the right side 31 of the base sheet 30, two parallel lines of stitching 38, 38 (only one being visible in Fig. 1) are extended through the overlying portions of the edging strip and through the base sheet. Of course, other suitable securing means may be employed in place of stitching, if desired. The lines of securement 38, 38 are substantially coextensive with each other, being disposed longitudinally of the edging sheet 34 and terminating short of its ends. Further, each of the securement lines 38, 38 extends along one of the folds 36, 36 so as to be adjacent to and spaced from its respective edging sheet fold.

The corrugated, central strip portion 37 is then longitudinally severed or cut, preferably along its crest to separate the strip 34 into a pair of parallel strip pieces 40, 40, see Fig. 2. That is, severance of the corrugation 37 serves to define of the edging sheet or strip 34, a pair of strip pieces 40, 40 each folded along a longitudinal line 36 and secured to the base sheet 30 with their longitudinal folds facing away from each other. As the securement lines 38, 38 are spaced from the folds 36, 36, it will be apparent that the folds define longitudinal tubular portions or beads on the outer edges of the folded strip pieces. Further, as will be appreciated more fully hereinafter, the strip pieces 40, 40 need not be folded, but may be of single thickness with their outer longitudinal edges finished as by a bead or selvage edge. Hence, while the folds or edges 36, 36 of the strip pieces 40, 40 will be hereinafter referred to as beaded, it is understood that the strip pieces need not be folded or beaded, but may have their outer edges finished otherwise, as desired. The strip pieces 40 of the illustrated embodiment may of course be independently arranged on and secured to the base sheet 30 by procedures other than that described in connection with Fig. 1, thereby eliminating the stage of Fig. 1.

The base sheet portion between the securement lines 38, 38 is then cut or severed to form a generally longitudinally extending slit 43. The end portions of the slit 43 are of generally V-shaped configuration diverging longitudinally outwards, as at 44, 44 and serve to form a pair of tabs 45, 45 extending inwards from opposite ends of the slit. The V-shaped end portions 44, 44 of the slit 43 also form a pair of flap portions 46, 46 on opposite sides of the slit and between the securement lines 38, 38. In overall length the slit is preferably substantially equal to the length of the securement lines 38.

In order to transform the base sheet 30 and strip pieces 40, 40 from the condition of Figs. 3-5, to that of Figs. 6-9, it is only necessary to pass the strip pieces through the slit 43 to the wrong side of the base sheet. This may be readily accomplished by merely turning or folding the end portions of the strip pieces 40, 40 which extend beyond the ends of the slit 43, inwards to overlie the medial portions of the strip pieces, and then manually stuffing the thus folded strip pieces through the slit. Upon emergence of the strip pieces on the wrong side of the base sheet, the end portions of the strip pieces will automatically unfold so as to extend beyond the slit 43 and lie close to the wrong side 32 of the base sheet 30. Passage of the strip pieces 40, 40 through the slit 43, as described above, will effect simultaneous swinging of the tabs 45, 45 through and out of the slit 43 so as to extend away from each other on the wrong side of the base sheet, best seen in Fig. 9.

Viewed otherwise, passage of the strip pieces 40, 40 through the slit 43 to the wrong side of the base sheet 30 may be considered as a folding of the base sheet flap portions 46, 46 along the securement lines 38, 38 to the wrong side of the base sheet. This will of course effect swinging movement of the strip pieces 40, 40 through the slit 43 to the wrong side of the base sheet, so as to swing the beads 36, 36 toward each other into the slit 43. As best seen in the Fig. 8, the width of the slit 43 is increased by folding of the flaps 46 along the securement lines 38, and the beads 36 are disposed in the slit extending along the flap folds. With the strip pieces 40, 40 passed completely through the slit 43, the previously overlying portions 35, 35 of the strip pieces will again be in overlying relation, and the strip pieces will tend to lie relatively flat in their folded condition, as seen in Fig. 7. In buttonhole construction, it is preferred to space the securement lines 38, 38 and proportion the beads 36, 36 so as to substantially close the slit 43, in the condition of Figs. 6.

In Fig. 10 are shown fragmentarily a sewing machine bed 49, a sewing machine presser foot 50 vertically shiftable toward and away from the bed, and a sewing machine needle 51 vertically reciprocable through the presser foot and into the bed. In addition, a cutting blade 52 is fixed to one side of the bed 49, and a second cutting blade 53 is mounted by any suitable means for shearing coaction with the blade 52.

The base sheet 30 and strip pieces 40, 40 of Figs. 6-9 are placed on the bed 49 with the wrong side 32 of the base sheet facing toward the bed. One of the tabs 45 and the adjacent pair of strip piece end portions are arranged under the presser foot 50 so that actuation of the needle 51 forms a short line of stitching or tack 54 securing the tab to the strip portions extending longitudinally beyond the slit. Further, the strip portions extending longitudinally beyond the tab and securement line 54 are severed or removed by actuation of the blade 53. The base sheet 30 may then be rotated to place the other tab 45 and its adjacent strip piece extensions under the presser foot 50 for securement of the latter tab and its adjacent strip piece end portions together, and severance of the last mentioned strip piece extensions. While the strip pieces 40 as shown in Figs. 6-9 tend to remain flat and relatively close to the base sheet 30, so as to retain the tabs 45 in engagement with the wrong side of the base sheet, the step illustrated in Figs. 10 and 11 will positively retain the strip pieces and tabs in position on the wrong side of the base sheet. More specifically, securement of the tabs 45 to the strip piece portions extending beyond the slit 43 prevents swinging of the tabs into the slit and return of the strip pieces through the slit.

In Figs. 12-18 are illustrated a sewing machine attachment for quickly and easily securing the edging sheet, strip or ribbon 34 to the base sheet 30 as illustrated in Fig. 1. The attachment, generally designated 57 is illustrated as employed in connection with a conventional sewing machine 58 having a bed 59, an arm 60 overhanging the bed, a presser foot bar 61 depending from the arm and shiftable toward and away from the bed, and a needle bar 62 depending from the arm 60 adjacent to and in front of the presser foot bar and vertically reciprocable toward and away from the bed.

The attachment 57 includes a carrier, generally designated 65, and a mount 66 for supporting the carrier from the presser foot bar.

The mount 66 includes an upper block or body 67 having its upper end shaped to slidably receive the lower end of the presser foot bar 61. Formed on the lower end of the block 67 is a horizontal, laterally extending rail or tenon 68 in the shape of an inverted T. A set screw 69, or other suitable means, extends into one side of the mount block 67 for holding engagement with the presser foot bar 61 to lock the block in position on the depending end of the foot bar. On the other side of the block 67 is pivotally mounted a bar or latch 70, for a purpose appearing presently.

The mount 66 also includes a lower body or block 71 having its upper end formed with a horizontal, laterally extending, inverted T-shaped slot 72 slidably receiving the rail or tenon 68. The block 71 is thus supported for lateral, horizontal shifting movement spaced above the sewing machine bed 59. Formed in an upper portion of the block 71 is a notch 73 for receiving the latch 70 to prevent lateral movement of the lower block. The notch 73 is positioned so as to retain the lower block 71 centrally with respect to the upper block 67; and, the latch may of course be raised to permit lateral shifting of the lower block or removal of the latter from the upper block as for affording access to bed. On the lower end of the block 71 are provided a pair of laterally spaced rails or tenons 75, 75 of inverted, T-shaped cross section, which extend forwardly and rearwardly with respect to the sewing machine spaced above the bed of the latter. Intermediate the rails 75, 75, formed in the lower end of the block 71, are a pair of parallel spaced grooves 76, extending forwardly and rearwardly of the sewing machine and opening downwards toward the sewing machine bed.

Secured to the front side of the block 71, in spaced relation with respect thereto, as by fasteners 79, is a vertically disposed plate 77 having its lower edge formed with a pair of downwardly facing notches 78, 78 in registry with the grooves 76, 76. Pivoted intermediate the block 71 and plate 77, as by a pin 81, is an arm 82 which has its free end portion swingable to extend substantially across and close the notches 78 and grooves 76, to the position illustrated in dot-and-dash outline. A manually actuable extension 83 is provided on the arm 82 to effect swinging of the latter between its full line open position and dot-and-dash line closed position.

The carrier 65 includes a horizontally disposed, generally rectangular plate or body 85 arranged below the block 71 and extending generally forwardly and rearwardly of the sewing machine. The carrier body is provided on its upper side with two laterally spaced pairs of forwardly and rearwardly extending tracks or guideways 86, each pair of which is adapted to slidably receive one of the depending rails 75. Hence, the carrier 65 is mounted below the block 71 for horizontal back and forth movement. Releasably clamped to the tracks 86, adjacent to opposite ends thereof, or otherwise as desired, are stop members 87 which engage with the rails 75 to limit back and forth movement of the carrier and prevent inadvertent removal of the carrier from the block 71.

It will be observed that forward and rearward carrier movement takes place below the needle bar 62. Further, the carrier body 85 is formed with a horizontally disposed passageway 88 which extends forwardly and rearwardly, opening through the front and rear ends of the carrier body, and is disposed at all positions of horizontal carrier movement directly below the needle bar 62.

In cross section, the passageway 88 may be rectangular as illustrated, and is preferably laterally elongated so as to extend on both sides substantially beyond a pair of needles 89 depending from the needle bar. A pair of parallel spaced lower slots 91 are formed in the carrier body 85 longitudinally of the passageway 88 and open downwardly from the passageway toward the sewing machine bed 59. It will be observed that the lower pair of slots 91 are disposed in vertical alignment with the needles 89 so as to receive the latter upon vertical reciprocation thereof, as shown in dot-and-dash outline in Fig. 14. Further, the lower slots 91 extend inwardly through the rear end of the carrier body 85 and terminate at points adjacent to and spaced from the front end of the carrier body, so as to define therebetween a rigid elongated tongue 92 fixed at its front end and free at its rear end. An upstanding rib or ridge 93 is formed on the tongue 92, centrally thereof, and extending longitudinally therealong. Further, the rib 93 extends the entire length of the carrier body terminating at the front and rear ends thereof.

The upper carrier body portion directly above the passageway 88 is entirely cut away, as at 94 from one end of the carrier body to the other, except for a pair of longitudinally disposed ledges, lips or flanges 95, 95. The ledges 95 extend laterally inwards toward each other, and longitudinally from the rear end of the carrier body to terminal edges 96, 96 adjacent to and spaced from the front end of the carrier body.

A laterally extending wall member or plate 98 is disposed on the upper surface of the carrier body 85 adjacent to and spaced rearwardly from the front end of the carrier body and bridging the upper carrier body opening 94 forwardly of the ledge ends 96. In this position, the plate 98 may be fixedly secured to the front ends of the tracks 86 by the fasteners 99, see Fig. 13. An elongated, rigid upper tongue 100 is disposed longitudinally of the carrier body 85 in spaced relation within the upper carrier body opening 94, extending from the plate 98 to the rear end of the carrier body. An upstanding flange 101 is formed on the front end of the tongue 100 and secured fast to the plate 98 by a screw 102 to fix the tongue 100 in position. As best seen in Fig. 14, the tongue 100 is disposed intermediate the ledges 95 and spaced from the latter to define therewith a pair of parallel spaced slots 103, 103 opening upwards from the passageway 88 through the carrier body 85, and in vertical alignment with the lower passageway slots 91, 91 respectively. Further, the tongue 100 is generally of an inverted W-shape in cross section to define a pair of longitudinal, internal grooves 104 opening downwards into the passageway 88 on opposite sides of the upstanding rib 93.

On the upper side of the carrier body 85, adjacent to the front end thereof, are adjustably secured a pair of guide members 106, 106, disposed in end to end relation and extending generally laterally with respect to the sewing machine. The outer ends of the guide members 106 are formed with a pair of laterally extending slots 107 for receiving headed hold down screws 108. The screws 108 may be withdrawn slightly upwards to permit lateral adjustment of the guide members and tightened downward to hold the guide members in a selected position with respect to the carrier body. The inner or adjacent portions of the guide members 106, 106 are offset upwards, as at 109, 109 extending thence into adjacent relation directly above the rib 93, as at 110, 110, and thence downwards and away from each other, as at 111, 111 into the lower outer regions of the passageway 88. Disposed longitudinally of and in spaced relation within the passageway 88 are a pair of parallel spaced elongated positioning members or rods 113, 113. The positioning rods are arranged outwardly and on opposite sides of the vertically aligned upper and lower slots 91 and 103, and have their front ends fixedly secured to the free ends of the guide member portions 111, 111, so as to support the rods in spaced relation within the passageway.

Formed in the underside of the carrier body 85, on opposite sides of the slots 91, 91 are a pair of parallel spaced longitudinally extending grooves 115, 115, each of which snugly receives an elongated strip 116 extending longitudinally beyond the front end of the carrier body and releasably secured in the grooves by set screws 114. An additional strip 118 is disposed longitudinally of and below each of the strips 116 and has one end hingedly connected to the front end of the latter strip, as at 117. Thus, the lower strips 118 are freely swingable relative to the strips 116 between positions closely underlying the carrier body 85 and engaging the sewing machine bed 59, see Fig. 18. Each of the swingable strips 118 is formed with a laterally outwardly projecting portion 119 having an upstanding ear 120 disposed outwards of the carrier body 85. That is, the lateral extensions 119 project outwardly beyond the carrier body, and are provided with upstanding ears or guide elements 120 disposed in substantially lateral alignment with each other.

In using the attachment 57 to practice the method of the present invention, it is only necessary to pass a strip or ribbon of edging material 34 through the carrier body passageway 88 with the ribbon arranged in the configuration illustrated in dot-and-dash outline in Figs. 13 and 14. That is, upon entry into the front end of the passageway 88, the central longitudinal portion of the ribbon 34 is transversely curved or corrugated upwards about the rib 93, and the longitudinal margins or side portions of the ribbon are folded upwards and inwards over the end portions 111 of the guide members 106. Behind the guide members 106, the ribbon 34 has its longitudinal edge portions extending upwards and received in the grooves 104 of the tongue 100, so that the longitudinal margins of the ribbon are retained in their upwardly and inwardly folded relation and the upper and lower carrier member slots 103 and 91 are unobstructed for freely receiving the needles 89.

With the ribbon 34 in position within the passageway 88, the presser foot bar 61 is raised to elevate the carrier body 85 above the bed 59, and the carrier body is shifted horizontally forwards along the rails 75 within the limits of the stops 87. The base sheet 30 is then inserted forwardly between the carrier body 85 and sewing machine bed 59 until its leading edge abuts the ears 120. That is, the base sheet 30 is inserted to overlie the downwardly swung strips 118, see Fig. 18, and ride therealong into engagement with the guide ears 120.

The presser foot bar 61 is then lowered to place the attachment 57 in the position of Fig. 15. Vertical actuation of the needle bar 62, and simultaneous rearward horizontal shifting of the carrier body 85 will then effect securement or stitching of the edging sheet 34 to the base sheet 30, as at 38, 38 in Figs. 1-3. That is, the carrier 65, ribbon 34, and base sheet 30 will all move together as a unit, frictional engagement of the ribbon in the passageway 88 effecting movement of the ribbon, and the ears 120 bearing against the edge of the base sheet 30 to guide the latter. Before stitching, it is preferred to engage the threads (not shown) of the needles 89 in the grooves 76 and notches 78, and swing the arm 82 to its closed position. This will serve to catch or hold the threads and insure firm stitches.

The presser foot 61 may now be raised to the position of Fig. 18, the arm 82 swung open to release the threads, and the ribbon passed rearwardly and severed to complete the stage illustrated in Fig. 1. Obviously, a new length of ribbon will thereby be disposed in the passageway 88 in position for another similar sewing operation, so that attachment is particularly well suited for use with a continuous ribbon of edging material.

Severance of the sewn edging material is preferably accomplished by the crossed blades 122, 122 shown in Figs 17 and 18, wherein the blades are pivoted as their cross over point, as by a pin 123, which is carried by a support member 124 fixed to the sewing machine 60 by an arm 125. The cutting blades 122 preferably have their free ends curved inwards so as to selectively grasp the edging material and not the base sheet and the blades have their actuating ends connected, by any suitable arrangement, such as the chain and lever means 126, 127, and 128, to a pedal (not shown) for foot operation.

In Fig. 19 is shown a fixed support 130 having an outstanding blade 131 secured to one side thereof, and an anvil 132 secured on the upper surface of the support. The blade 131 is fixed at its lower end, as by fasteners 134, to one side of the support 130, and extends upwardly along the support terminating at a free upper end. Further, the blade 131 tapers upwards, and preferably has its cutting edge facing inwards, toward the support 130 as at 135.

In use, the base sheet 30 with the edging sheet 34 secured thereto, may be manipulated to receive the upper end of the blade 131 between the central corrugation 37 of the edging strip and the base sheet with the latter disposed adjacent to the outer or non-cutting edge of the blade. Upon downward movement of the base sheet, as illustrated in the drawing, to effect continued insertion of the blade between the base sheet and edging sheet, the cutting blade edge 135 will effect severance of the corrugated strip portion generally along the crest of the latter to complete the stage illustrated in Fig. 2.

The anvil 132 comprises a generally elongated body having its upper face formed with a longitudinal central groove 137, and a pair of outwardly diverging V-shaped grooves 138, 138 on opposite ends of and opening into the groove 137. That is, the vertices of the grooves 138 are coincident with the ends of the groove 137. In addition, a pair of gripping grooves 139, 139 are formed in the face of the anvil 132 disposed parallel to and on opposite sides of the longitudinal central groove 137. One end of the anvil face is cut away or recessed to receive a cross piece or stop member 140 secured to the anvil by a fastener 140a. The opposite sides of the elongated anvil body 132 are preferably concavely undercut, as at 141, 141 adjacent to the upper anvil face and extending the length of the anvil body, for a purpose appearing presently.

A working head 143 is mounted above the anvil 132 by any suitable means (not shown) for vertical movement toward and away from the anvil. A cutting die 144 is fixed to the lower end of the working head and includes a longitudinal central blade 145, and a pair of end blades 146 arranged in a V-shaped configuration diverging from each end of the central blade. All of the blades 145 and 146 of the cutting die are vertically disposed, having their lower edges sharpened, and are of a size and shape to register with and engage in the grooves 137 and 138 of the anvil face.

A presser member or holding plate 147 is disposed horizontally between the anvil 132 and the lower end of the working head 143, and is mounted on the latter for movement therewith and movement toward and away from the working head. That is, the presser plate is provided with a pair of headed shanks 148 which extend upwards into the working head 143 and have their heads slidable in the working head, as in bores 149. Further, coil compression springs 150 are circumposed about the shanks 148 and have their opposite ends in engagement with the presser plate 147 and the lower end of the working head, so as to yieldably and resiliently urge the presser plate downwards away from the working head. Formed in the presser plate, in registry with the blades of the cutter die 144 are slots or apertures 151 specifically configured to receive the blades of the cutter die. Further, a pair of ribs 152, 152 are formed on the underside of the presser plate in registry with the grooves 139, 139 of the anvil face.

In use, the base sheet 30 at the stage of Fig. 2 is arranged with its right face or side downwards in engagement with the upper face of the anvil 132, preferably by sliding the base sheet over the anvil, from right to left as viewed in Fig. 19, with the strip pieces 40, 40 on opposite sides of the anvil 132 and received in the undercut concavities 141, 141. One adjacent pair of the free or unsecured end extensions of the strip pieces 40, 40 will be deflected downwards by the stop 140, and the secured portions of the strip pieces will engage with the stop to limit movement of the base sheet 30 over the anvil and properly position the base sheet for cutting of the slits 43 and 44. That is, with the base sheet 30 in the position illustrated in Fig. 19 in dot-and-dash outline, the working head 143 is moved downwards towards the anvil 132. The presser plate 147 first engages with the base sheet 30, the ribs 152 and grooves 139 coacting to grip the base sheet and prevent inadvertent shifting of the latter relative to the anvil. Upon continued downward movement of the working head 143, the shanks 148 retract into the working head, and the blades 145 and 146 of the cutting die pass through the slots 151 of the presser plate, and through the base sheet 30 into the slots 137 and 138 of the anvil. In this manner, the base sheet 30 is severed, as shown in Fig. 3.

The strip pieces 40 may then be passed through the slit 43, and the tabs and strip piece end portions secured and severed, as described hereinbefore, to finish the buttonhole forming precedure.

From the foregoing, it is seen that the present invention provides a method of forming a buttonhole or other similar construction, and apparatus for use therein, which fully accomplish their intended objects, and which are well adapted to meet practical conditions of use.

Although the present invention has been described in some detail by way of illustration and example for purposes of clarity of understanding, it is understood that certain changes and modifications may be made within the spirit of the invention and scope of the appended claims.

What is claimed is:

1. A buttonholing device for attachment to a sewing machine having a bed, a vertically movable presser foot bar depending toward said bed and a vertically movable needle bar depending toward said bed adjacent to said presser foot bar, said device comprising: a unitary carrier body adapted to be mounted on the depending end of said presser foot bar for vertical movement with the latter and reciprocating horizontal movement under said needle bar, said carrier being formed with an open-ended passageway extending in the direction of said reciprocating horizontal movement and disposed directly below said needle bar throughout said horizontal movement, there being a pair of parallel spaced upper slots formed in said carrier body longitudinally of and opening upwards from said passageway, there being a pair of lower slots formed in said carrier body disposed in vertical alignment respectively with said upper slots and opening downwards from said passageway, said upper and lower slots being adapted to receive a pair of vertically moving needles carried by said needle bar during horizontal movement of said carrier body, and a pair of elongated positioning members located longitudinally of and in spaced relation within said passageway on opposite sides of said upper and lower slots and fixedly secured to said carrier body, whereby a flexible strip is adapted to be disposed longitudinally within said passageway with its side margins folded inwards about said positioning members for double stitching said strip in its folded condition to a sheet disposed between said carrier and bed.

2. A buttonholing device according to claim 1, in combination with an upstanding rib on said carrier body extending longitudinally within said passageway intermediate said pair of lower slots, said rib serving to form in said strip a longitudinally extending central corrugation.

3. A buttonholing device according to claim 1, wherein said passageway is formed with a pair of internal grooves extending longitudinally of and opening downwards into said passageway intermediate said upper pair of slots, said grooves serving to receive the longitudinal edge portions of said strip and hold the side margins of said strip in folded relation.

4. A buttonholing device according to claim 1, in combination with abutment ears carried on the underside of said carrier body for effecting movement of said sheet on said bed together with said carrier body and strip.

5. A buttonholing device according to claim 2, said carrier being formed internally of said passageway with a pair of grooves extending longitudinally of and opening downward into said passageway on opposite sides respectively of said rib, said grooves serving to receive the longitudinal edge portions of said strip and hold the side margins of said strip in folded relation.

References Cited in the file of this patent

UNITED STATES PATENTS

| | | |
|---|---|---|
| 439,413 | Lyon et al. | Oct. 28, 1890 |
| 1,179,378 | Allen | Apr. 11, 1916 |
| 1,633,196 | Siarkowski | June 21, 1927 |
| 2,063,398 | Pikul et al. | Dec. 8, 1936 |
| 2,573,359 | Rich | Oct. 30, 1951 |
| 2,581,046 | Rich | Jan. 1, 1952 |
| 2,607,308 | Bufardeci | Aug. 19, 1952 |
| 2,620,759 | Pantusco et al. | Dec. 9, 1952 |
| 2,671,903 | Breul | Mar. 16, 1954 |
| 2,705,930 | Mosberg | Apr. 12, 1955 |
| 2,711,142 | Matthies | June 21, 1955 |
| 2,715,375 | Spaine | Aug. 16, 1955 |
| 2,734,470 | Mosberg | Feb. 14, 1956 |
| 2,780,193 | Smith et al. | Feb. 5, 1957 |